Figure 1:
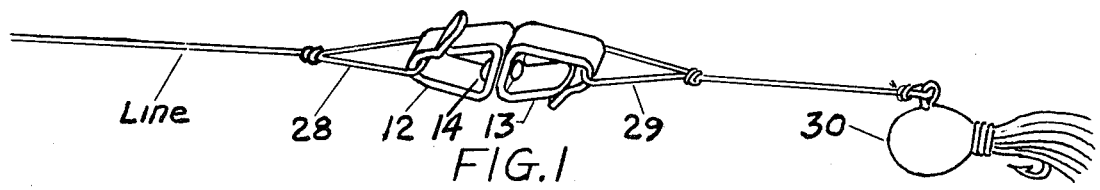

United States Patent [19]

Zalonis

[11] 4,141,116

[45] Feb. 27, 1979

[54] SNAP SWIVEL FOR FISHING TACKLE

[76] Inventor: Victor J. Zalonis, 9 Holiday Ave., Hatfield, Pa. 19440

[21] Appl. No.: 882,404

[22] Filed: Mar. 1, 1978

[51] Int. Cl.² ............................................. A44G 13/02
[52] U.S. Cl. .................................. 24/73 HR; 24/237; 43/44.83; 59/95; 403/164
[58] Field of Search ............. 24/237, 73 HR, 73 HH, 24/73 A; 403/164, 69; 43/44.83, 44.98; 59/95; 70/459

[56] References Cited

U.S. PATENT DOCUMENTS

| 799,491 | 9/1905 | Palmer | 59/95 |
|---|---|---|---|
| 1,313,372 | 8/1919 | Dodge | 43/44.83 |
| 2,193,291 | 3/1940 | Marchins | 59/95 |
| 2,223,594 | 12/1940 | Bednarek | 24/237 |
| 2,423,050 | 6/1947 | Rundell | 59/95 |
| 2,739,408 | 3/1956 | Eatinger | 59/95 |
| 3,102,313 | 9/1963 | Arneson | 43/44.83 |
| 3,200,459 | 8/1965 | Hartman | 24/73 A |

FOREIGN PATENT DOCUMENTS

| 101350 | 7/1937 | Australia | 59/95 |
|---|---|---|---|
| 936061 | 12/1955 | Fed. Rep. of Germany | 24/73 X |

*Primary Examiner*—Bernard A. Gelak

[57] ABSTRACT

A band of spring material is folded upon itself to form a closed triangle with the ends of the band overlapping on one side of the triangle to form a normally closed but openable passageway into and out of the triangle, another side of the triangle having a hole therethrough in which a swivel pin can turn, the swivel pin being connected to a normally closed but openable hook element for receiving a fishing accessory.

8 Claims, 11 Drawing Figures

U.S. Patent     Feb. 27, 1979     4,141,116

SNAP SWIVEL FOR FISHING TACKLE

This invention relates to fishing tackle and particularly to a snap-swivel which is interposed between the fishing line and the accessory parts such as the lure, bait and sinker. The snap-swivel equipment of this invention possesses the dual features of simplifying the attachment and detachment of the line to such accessory parts and also providing a freely functional swivel or pivot between them. Another feature is that the snap-swivel is of minature size even though it is exceptionally strong.

As to the simplified attachment-detachment means, the snap or clasp portion of the equipment eliminates the need to tie a line thereto and the formation of the usually cumbersome, time consuming knots is overcome. Moreover, once the line or accessory is attached to the equipment it cannot easily become dislodged or detached but a slight manual effort will make this possible.

As to the swivel provision of the equipment of this invention, a very small pivot connection is established between the line and the accessories or between the accessories themselves. The overall miniature size of the snaps and the swivel connection between them is an important feature of this invention as the movement of the snap-swivel through the water creates a minimal water disturbance. This is important as any disturbance or turbulence in the water and particularly the formation of air bubbles, can distract the fish and scare them away.

A foremost feature of the invention is that the snap-swivel is easily constructed from inexpensive material so that it can be sold at a low price. The same basic construction can be made in different sizes for small to large fish.

Figure 2:
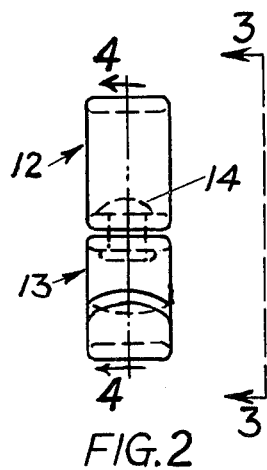
Figure 3:
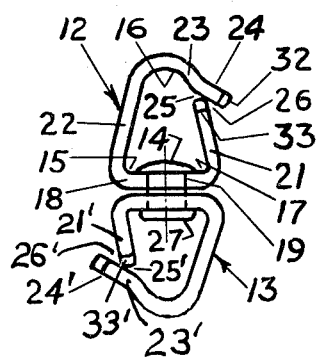
Figure 4:
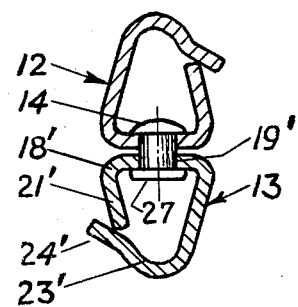
Figure 5:
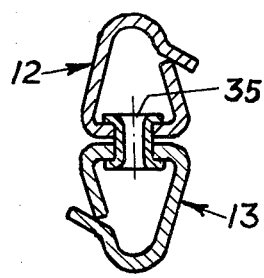
Figure 6:
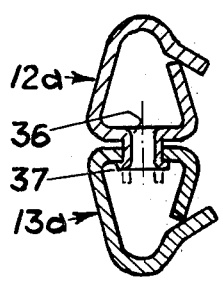
Figure 7:
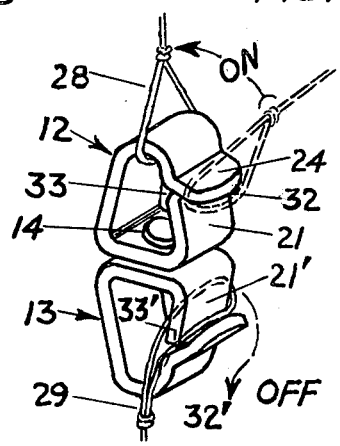
Figures 8, 8A:
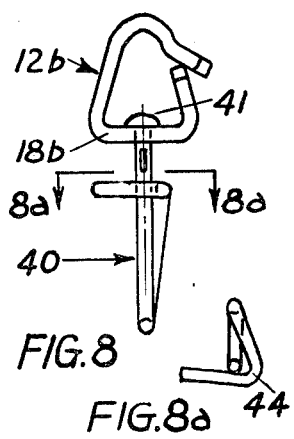
Figure 9:
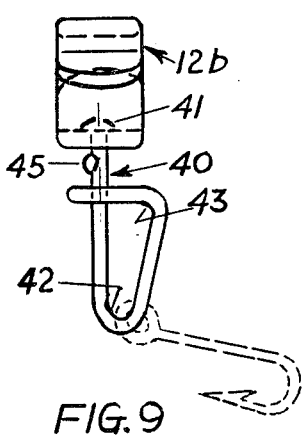
Figure 10:
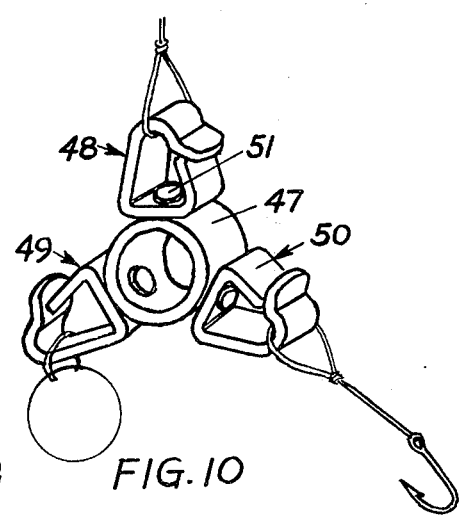

Illustrative embodiments of the invention, representing variations thereof, are shown in the drawings in which:

FIG. 1 is a perspective view of the preferred form of the snap-swivel with a fishing line and a lure attached to its opposite ends, FIG. 2 is a side elevation of the snap-swivel of FIG. 1, FIG. 3 is an elevational view on the line 3—3 of FIG. 2, FIG. 4 is a sectional view on the line 4—4 of FIG. 2 except for the swivel pin, FIG. 5 is a sectional view similar to FIG. 4 but showing a different form of swivel pin, FIG. 6 is a sectional view similar to FIG. 4 but showing another variation of the swivel connection, FIG. 7 is a perspective view of the snap-swivel of FIG. 1 showing the manner of attachment and detachment of lines thereto, FIG. 8 is a side elevation of another modification of the invention, FIG. 8a is a section on the line 8a—8a of FIG. 8, FIG. 9 is an elevational view of the lateral side of FIG. 8 and FIG. 10 is a perspective of another embodiment of the invention.

Referring to FIGS. 1 to 4, the snaps 12 and 13 are of identical construction and they are pivotably connected together at their bases by the swivel pin 14. This swivel pin permits their free rotational movement about the pin and this prevents or at least greatly reduces the likelihood that the lines will become snarled or twisted. A description of the snap 12 will suffice for a description of the snap 13 as they are alike.

The snap 12 is made from a flat strip or band of strong material such as brass or steel and preferably stainless steel. It would be possible to use a strong plastic but this would probably require an increased size to have the same strength as a metal. The band is described as flat because it is an elongated rectangle in cross section. It should have rounded edges so that it will not cut into the line.

The band is bent inwardly on itself at the three inner acute angles 15, 16 and 17. Between the angles 15 and 17 is the base portion 18 of the snap 12 and it has a centrally located hole 19 through it. Beyond the angle 17 is a terminal end portion 21 of the band and it projects toward the angle 16, but falls short of it.

Between the angles 15 and 16 is an inner portion of the band and this portion 22 is similar to the inner or base portion 18 which has a hole through it. Beyond the angle 16 is a terminal end portion 23 which is in line with end portion 21 and comes close to it or contacts it. The end portion 23 terminates in an outwardly turned tang 24 which flares outwardly away from the end portion 21.

The base portion 18, the inner portion 22 and the touching terminal portions 21 and 23 form a closed triangle and the spring action of the material should compressibly force the terminal portions 21 and 23 against each other. Where they contact each other only a small crevice 25 should appear to simplify the removal of the fishing line, as will be explained. Except for this slight crevice 25 the inner face formed by the portions 23 and 21 is quite smooth so that the line will not become caught and tend to open the triangle. Actually, a pull by the line in the angle 16 in a direction away from the base 18 will tend to open the triangle but it will cause the tip end of portion 21 to more forcibly bear against the inner face of portion 23 and keep the triangle closed.

It has been stated above that the snap 13 is identical to the snap 12 and consequently the base portion 18' of snap 13 has a hole 19' through it. The two base portions 18 and 18' are brought together so that their holes 19 and 19' line up and the headed rivet is passed through them; then the free end of the rivet is upset or headed over at 27 to hold the snaps together. It is important that a slight space exist between the opposing faces of the base portions 18 and 18' so that the two snaps are entirely free to swivel or pivot relative to each other.

FIG. 7 shows how the fishing line 28 is attached to the snap 12 and this same proceedure is followed to attach to snap 13 the loop 29 for a fishing accessory such as the lure 30 in FIG. 1. The loop 28 is first placed under the tang 24 and into the external crevice 26 and then the loop is pulled along under the tang and into the interior of the snap. The snap portions 21 and 23 readily yield apart to make this entry possible and to simplify this and also to prevent the end of the tang from cutting into the loop the tip is rounded off at 32.

FIG. 7 also shows how the accessory loop 29 such as a snelled hook loop is disengaged from the snap 13 and this same procedure is followed to remove the line 28 from the snap 12. One side of the loop 29 is placed in the exterior crevice 26' and then pulled down so that the ends 24' and 21' are forced apart. After the loop moves through this passageway it is free and can be withdrawn and the ends 21' and 24' spring shut. The rounded end 33' facilitates this.

FIG. 5 shows a different kind of pivot or swivel connection between the snaps 12 and 13 which are the same as the snaps in FIGS. 1 to 4. The swivel pin 35 is a tube, the ends of which have been flared outwardly to form heads to keep the pin in place.

FIG. shows a variation in that the snap 12a is integrally formed with a stem 36, which may be solid or tubular, to act as the swivel pin. This stem can readily be formed if the snap 12a is made of plastic. It would be inserted in the snap 13a which is the same as snap 13 and then the end of the stem would be rounded over to form a head.37.

In the modification of FIG. 8 the snap 12b is the same as the snap 12 and the snap 13 is replaced with a wire hook 40 as the snap. This wire is headed at 41 so it will not pull through and this wire can turn freely in the hole of the snap 12b. At a point about midway along the length of the wire it has a sharp bend at 42 to form an acute angle. Further along the wire is another acute angle 43 which turns the wire to lie against the descending portion of the wire and just beyond this contact point is a right angle turn 44 in the wire. This terminal portion of the wire would also bear against the descending portion of the wire but in FIG. 8a, for illustration purposes only, the wire portions are not shown in contact.

The wire hook or snap of FIGS. 8 and 9 is particularly useful if a large sinker with a hole in it is to be directly attached without using a snell loop. The spring quality of the wire will permit it to be opened up enough to permit direct insertion of the wire end in the sinker hole and movement of the sinker to the angle 42. The eye of a hook, lure or other fishing accessory can as easily be located directly on the wire snap 40.

The bends in the wire 40 could be made after the straight wire is inserted through the hole in the snap 12b. Or, in some cases the wire may be prebent to shape and then be passed through the hole in the snap 12b. The wire may be upset at 45 to form a shoulder just below the base 18b of the snap to limit endwise movement of the wire while still allowing its free rotation.

FIG. 10 shows how a central ring or short tube 47 may be used for the swivel attachment of several snaps 48, 49 and 50, which may each be the same as snap 12. One or more of these snaps may be like snap 12a or like the wire snap 40. The swivel pin 51 may be like 14, 35 or 36 or obvious variations of them. The multiple structure of FIG. 10 is useful because it provides for the separate attachment on each snap of the fishing line, a sinker weight and a lure, for example. It permits a quick replacement of any one of them with a different accessory and only the one to be replaced needs to be disturbed.

I claim:

1. A snap-swivel for fishing equipment comprising a first snap member consisting of a resilient flat band of uniform width which is rectangular in cross section and has opposite flat broad surfaces and which has three acute angle bends on the same side thereof, two terminal end portions overlapping to form a closed but openable approximate triangle, one of the sides of said triangle serving as a flat base and having a hole therethrough, and a second snap member which comprises a normally closed but openable hook which is connected to the first snap member by a swivel pin which is rotatably located in said hole and has a head with a flat under face which bears on said flat base so that the second snap member is freely rotatable but is retained against endwise displacement therefrom.

2. The snap-swivel of claim 1 in which the swivel pin is integral with one of the snap members.

3. The snap-swivel of claim 1 in which the swivel pin is a separate element.

4. The snap-swivel of claim 1 in which the second snap member is a wire having a head which has said flat under face and which is within the triangular form of the first snap member and having acute angle bends outside of the triangular form to define said hook.

5. The snap-swivel of claim 1 in which the second snap element is a duplicate of the first snap element, and the swivel pin is located in their holes.

6. The snap-swivel of claim 1 in which the first and second snap members are separately pivotably connected to an intermediate element.

7. The snap-swivel of claim 1 in which the two terminal end portions are in line with each other except for an outturned tip of the one where it overlies the other tip.

8. The snap-swivel of claim 1 in which the two terminal end portions have rounded tip ends.

* * * * *